(12) United States Patent  
Bonnefous

(10) Patent No.: US 9,048,763 B2  
(45) Date of Patent: Jun. 2, 2015

(54) CONTROL CIRCUIT AND METHOD FOR AN ELECTRIC MOTOR, IN PARTICULAR FOR DRIVING A WINDSHIELD WIPER

(75) Inventor: Edouard Bonnefous, Saint-Mande (FR)

(73) Assignee: ECE, Paris (FR)

( * ) Notice: Subject to any disclaimer, the term of this patent is extended or adjusted under 35 U.S.C. 154(b) by 157 days.

(21) Appl. No.: 13/695,730

(22) PCT Filed: May 4, 2011

(86) PCT No.: PCT/EP2011/057135  
§ 371 (c)(1),  
(2), (4) Date: Jan. 8, 2013

(87) PCT Pub. No.: WO2011/138367  
PCT Pub. Date: Nov. 10, 2011

(65) Prior Publication Data  
US 2013/0099711 A1   Apr. 25, 2013

(30) Foreign Application Priority Data

May 6, 2010   (FR) ..................................... 10 53550

(51) Int. Cl.  
*H02P 1/00* (2006.01)  
*H02P 3/00* (2006.01)  
*H02P 7/00* (2006.01)  
*B60S 1/08* (2006.01)

(52) U.S. Cl.  
CPC .... *H02P 7/00* (2013.01); *B60S 1/08* (2013.01)

(58) Field of Classification Search  
USPC ......... 318/443–446, 280, 282, 283, 268, 483, 318/266, 466  
See application file for complete search history.

(56) References Cited

U.S. PATENT DOCUMENTS

| 4,329,631 | A | * | 5/1982 | Betsch et al. ................. 318/466 |
| 4,406,322 | A | * | 9/1983 | Rossi et al. ................... 165/202 |
| 4,422,024 | A | * | 12/1983 | Itoh et al. ...................... 318/443 |
| 4,461,958 | A | * | 7/1984 | Krohling et al. ................ 290/45 |
| 4,494,059 | A | * | 1/1985 | Kearns .......................... 318/443 |
| 4,663,575 | A | * | 5/1987 | Juzswik et al. ............... 318/444 |
| 4,673,853 | A | * | 6/1987 | Tsunoda et al. .............. 318/443 |
| 4,689,535 | A | * | 8/1987 | Tsunoda et al. .............. 318/443 |
| 4,742,280 | A | * | 5/1988 | Ishikawa et al. ............. 318/282 |
| 4,866,357 | A | * | 9/1989 | Miller et al. .................. 318/443 |

(Continued)

*Primary Examiner* — Paul Ip  
(74) *Attorney, Agent, or Firm* — Meyertons, Hood, Kivlin, Kowert & Goetzel, P.C.; Eric B. Meyertons

(57) ABSTRACT

The invention relates to a control circuit (3) for an electric motor, in particular for driving a windshield wiper, including a control means (16) comprising an output for controlling the electric motor, the control means being capable of varying the angle of the motor between a given minimum value and maximum value. In particular, the control means (16) comprises an input for receiving a speed set point and is capable of controlling the angular speed of the motor according to the speed set point, the control circuit likewise including a set point means (14) comprising an input for receiving values of the angle of the motor and an output for providing a speed set point to the control means, the set point means (14) being capable of determining the speed set point from a continuous function of the motor angle. The invention likewise relates to a driving mechanism (2) for producing an alternating rotary motion comprising a circuit (3) such as described previously and an electric drive motor (4), as well as to a windshield wiper device (I) including at least one driving mechanism (2) such as described previously and an windshield wiper arm (5) driven by the driving mechanism.

14 Claims, 3 Drawing Sheets

(56) References Cited

U.S. PATENT DOCUMENTS

| | | | | |
|---|---|---|---|---|
| 5,097,193 | A * | 3/1992 | Neis et al. | 318/800 |
| 5,225,752 | A * | 7/1993 | Yasuda et al. | 318/443 |
| 5,298,845 | A * | 3/1994 | DeBoer et al. | 318/609 |
| 5,333,351 | A * | 8/1994 | Sato | 15/250.13 |
| 5,377,296 | A * | 12/1994 | Greenway et al. | 388/816 |
| 5,384,526 | A * | 1/1995 | Bennett | 318/610 |
| 5,428,277 | A * | 6/1995 | Stanton | 318/444 |
| 5,485,049 | A * | 1/1996 | Shannon et al. | 310/248 |
| 5,822,827 | A * | 10/1998 | Dimatteo et al. | 15/250.203 |
| 5,917,298 | A * | 6/1999 | Miller | 318/444 |
| 5,923,137 | A * | 7/1999 | Amagasa et al. | 318/443 |
| 5,929,588 | A * | 7/1999 | Shiah | 318/653 |
| 5,982,123 | A * | 11/1999 | Hornung et al. | 318/443 |
| 5,990,647 | A * | 11/1999 | Zettler | 318/483 |
| 6,011,369 | A * | 1/2000 | Grass | 318/445 |
| 6,150,783 | A * | 11/2000 | Michenfelder et al. | 318/443 |
| 6,249,098 | B1 * | 6/2001 | Miyazaki et al. | 318/280 |
| 6,288,509 | B1 * | 9/2001 | Amagasa | 318/443 |
| 6,359,407 | B1 * | 3/2002 | Michenfelder et al. | 318/443 |
| 6,388,411 | B1 * | 5/2002 | Ostrowski | 318/461 |
| 6,496,344 | B1 * | 12/2002 | Hog | 361/92 |
| 6,696,808 | B2 * | 2/2004 | Schmid et al. | 318/445 |
| 6,703,804 | B1 * | 3/2004 | Courdier et al. | 318/445 |
| 6,801,006 | B2 * | 10/2004 | Moosmann et al. | 318/444 |
| 6,819,069 | B2 * | 11/2004 | Hornberger et al. | 318/400.12 |
| 6,831,431 | B1 * | 12/2004 | Dieterle et al. | 318/268 |
| 6,953,100 | B2 * | 10/2005 | Aberle et al. | 429/432 |
| 6,993,961 | B2 * | 2/2006 | Wieser | 73/146 |
| 7,009,355 | B2 * | 3/2006 | Heo | 318/483 |
| 7,015,671 | B2 * | 3/2006 | Knab et al. | 318/701 |
| 7,098,618 | B2 * | 8/2006 | Morishita | 318/444 |
| 7,129,673 | B2 * | 10/2006 | Eisenhardt et al. | 318/400.02 |
| 7,586,275 | B2 * | 9/2009 | Amagasa | 318/282 |
| 8,005,590 | B2 * | 8/2011 | Ikeda et al. | 701/36 |
| 8,112,197 | B2 * | 2/2012 | Amagasa et al. | 701/36 |
| 2003/0020422 | A1 * | 1/2003 | Schmid et al. | 318/445 |
| 2004/0075410 | A1 * | 4/2004 | Knab et al. | 318/445 |
| 2009/0125183 | A1 * | 5/2009 | Amagasa et al. | 701/36 |
| 2009/0132115 | A1 * | 5/2009 | Ikeda et al. | 701/36 |

* cited by examiner

CONTROL CIRCUIT AND METHOD FOR AN ELECTRIC MOTOR, IN PARTICULAR FOR DRIVING A WINDSHIELD WIPER

The present invention relates to circuits and methods for controlling electric motors, especially motors driving windshield wipers. The invention also relates to a driving device used to produce an alternating rotary movement in one direction and then in another, and to a windshield wiping device. Such movements are typically used to wipe the windshields of vehicles, for example automobiles, trucks, trains, aircraft, etc.

It is known, especially in order to drive the rear windshield wiper of an automotive vehicle, to use a motor that produces a pendular movement. The motor angle is then proportional to the angle of the blade of the windshield wiper, for a constant reduction ratio. An example of such a motor is especially described in patent U.S. Pat. No. 4,271,381. The reducing mechanism may be a cog associated with a worm screw, and the changes in the direction of travel of the windshield wiper may be controlled by electrical power switches that are securely fastened to the drive shaft of the motor, and that provide the motor with DC current. Other examples are also described in documents FR 2 893 575, WO 98/30422, WO 99/06251, FR 2 744 685, WO 02/22409 and WO 96/07566. In these devices, the motor is controlled depending on the angle of the motor, especially the two angles bounding the region wiped by the windshield wiper and the parking angle, or depending on mechanical stops marking these characteristic angles. The motor is then controlled using on/off/reverse commands. However, these devices are not suited to applications in which higher values of torque, especially aerodynamic torque, inertia and windshield wiper blade length, are encountered. This is because, in these applications, the half-turns of the windshield wiper cannot be achieved by sudden switching. In addition, the motors operate in an open-loop mode and therefore at maximum torque, thereby reducing their operating efficiency at low rotation speeds.

Devices are also known that generally comprise a motor and a mechanical converter, the converter being used on the one hand to obtain a reduction in the speed of the electric motor, and on the other hand to convert the rotational movement into a back-and-forth movement. In such a device, the axis of the motor always turns, more or less rapidly, in the same direction. A connecting rod and crank system, for example, converts the rotary movement into an alternating movement. Moreover, for aircraft, these devices also have a parking position generally located outside of the wiped region of the windshield. For this purpose, the connecting rod and crank mechanism may comprise an eccentric cam and a ratchet. With such a device, the rotation direction of the motor defines the mode of operation of the windshield wiper: the windshield is wiped when the motor turns in a given direction, and the wiper is parked in the parking position when the motor turns in the other direction.

Devices comprising a connecting rod and crank system have a number of drawbacks. This is because these devices comprise many parts and are designed for a given geometry (angle wiped, parking position, etc.). Thus, such devices are expensive, complex, bulky, and require sufficient space to enable conversion of the rotary movement into the back-and-forth movement. In addition, because of the many parts, the mechanical converter has a non-negligible weight, which is most commonly carried on board a vehicle. Finally, since the device is designed for a specific geometry, it is necessary to remake a number of parts when it is desired to manufacture such a device for a new application.

One aim of the present invention is therefore to provide a circuit allowing more effective control of a motor, especially for driving a windshield wiper, for example by limiting the amount of electrical power consumed by the motor and how hot it gets. Moreover, another aim of the invention is to provide a driving device that is compact, reliable and easy to install, and that can be employed in any sort of application with little or no structural modification.

For this purpose, in one embodiment, a control circuit for an electric motor, especially for driving a windshield wiper, is provided, which circuit comprises a control means delivering an output for controlling the electric motor, the control means being able to make the angle of the motor vary between a given minimum value and a given maximum value. In particular, the control means comprises an input for receiving a speed setpoint, and is able to control the angular speed of the motor depending on the speed setpoint, the control circuit also comprising a setpoint-generating means comprising an input for receiving values of the motor angle and an output for delivering a speed setpoint to the control means, the setpoint-generating means being able to define the speed setpoint using a continuous function of the motor angle.

The expression "continuous function" is understood to mean a function for which, when the motor angle approaches a given angle, the speed setpoint approaches the setpoint value for said given angle. This means in particular that the speed setpoint varies gradually as a function of the motor angle i.e. there are no abrupt changes in value. Thus, the circuit is able to control the speed of the motor in order to limit the electrical power consumed by the motor, while the device remains compact, light and reliable. For example, the change in the speed setpoint may, for a given change in the motor angle, be smaller than or equal to a specified value. The change in the speed setpoint may be smaller than or equal to one quarter, preferably one sixth, more preferably one eighth, and even more preferably one tenth of the maximum speed setpoint, for any change in the motor angle equal to one twentieth of the difference between the maximum value and a minimum value of the angle of the motor, i.e. for any change in the motor angle equal to one twentieth of the wiped region.

When the control circuit is an analog circuit and the motor angle is measured by a position sensor delivering a continuous signal, the speed setpoint may be a continuous function of the motor angle.

When the control circuit is a digital circuit and the motor angle is a sampled signal, the speed setpoint may also be a sampled function, but one that is defined, for each sample of the motor angle, using a continuous function.

In particular, during the half-turns of the motor, the speed setpoint decreases, reaches zero and changes sign. Thus sudden changes in the rotation direction, and substantial power loss, are avoided. Moreover, to control the speed of the motor using the speed setpoint, the torque of the motor is adjusted, thereby ensuring that no more torque is used than is necessary and sufficient.

The setpoint-generating means may be able to define a first angular value for the motor, which value is greater than the minimum value, and a second angular value lying between the first angular value and the maximum value, to deliver a speed setpoint varying with the value of the motor angle when the latter lies between the minimum value and the first value or between the second value and the maximum value, and to deliver a speed setpoint of constant absolute value (corresponding to the absolute value of the maximum speed setpoint desired) when the value of the motor angle lies between the first and the second value. The speed setpoint then comprises three parts as a function of the motor angle: a first increasing part corresponding to an increase in the speed of the motor until the desired maximum speed is reached; a second constant part corresponding to wiping of the windshield at the desired speed; and a third decreasing part corresponding to a decrease in the speed of the motor before the change in direction. Such a speed setpoint especially allows a uniform rotational movement to be obtained between the first value and the second value, i.e. in the wiped region, thereby ensuring the visual comfort of the user. In addition, the effects of inertia on the motor, and power loss, are thereby limited since the speed of the motor is controlled to increase or decrease progressively.

The setpoint-generating means may also comprise an input for selecting a user mode, the desired maximum speed setpoint, and the maximum value, the minimum value, the first value, and the second value of the motor angle possibly being defined depending on the user mode selected. The user mode corresponds to an operating mode of the windshield wiper, for example depending on how heavily it is raining on the windshield.

The control means may also comprise an input for receiving values of the angular speed of the motor, and may be able to control the motor torque depending on the difference between the angular speed of the motor and the speed setpoint. The angular speed of the motor is then controlled in a closed loop by the control means. In other words, the angular speed of the motor is controlled by feedback by the control means. Thus a better angular speed is obtained, especially relative to the speed setpoint.

The control means may also comprise an input for receiving a motor angle setpoint and an input for receiving motor angle values, and may be able, in phases when the motor is stopped, to control the motor depending on the difference between the motor angle and the motor angle setpoint. The motor angle is then controlled in a closed loop by the control means.

The circuit may also comprises a defining means comprising an input for receiving values of the motor angle, and an output for delivering, to the control means, the angular speed of the motor, the defining means being able to calculate the angular speed of the motor using the values of the motor angle.

The invention also relates to, according to another aspect, a driving device for producing an alternating rotary movement, comprising a circuit such as described above, and a driving electric motor.

The motor may be a synchronous motor and preferably a brushless synchronous motor.

The invention also relates to a windshield wiping device, in particular for an automotive vehicle or an aircraft, comprising at least one driving device such as described above, and a windshield wiper blade driven by the driving device, optionally via a mechanical transmission. The mechanical transmission preferably has a fixed reduction ratio. The mechanical transmission may be a cog and a worm screw, or a direct gear train device.

According to another aspect, a method is provided for controlling an electric motor, especially for driving a windshield wiper, in which the motor is controlled in order to make the motor angle vary between a given minimum value and a given maximum value, and in which the angular speed of the motor is also controlled depending on a speed setpoint, said speed setpoint being defined using a continuous function of the motor angle.

Advantageously, a first angular value of the motor, which value is greater than the minimum value, and a second angular value lying between the first angular value and the maximum value, are defined, a speed setpoint varying with the value of the motor angle is delivered when the latter lies between the minimum value and the first value or between the second value and the maximum value, and a constant speed setpoint (corresponding to a desired maximum speed setpoint) is delivered when the value of the motor angle lies between the first and the second value.

The value of the constant speed setpoint, and the maximum value, the minimum value, the first value and the second value of the motor angle may be defined depending on a user mode.

Advantageously, the motor torque is also controlled depending on the difference between the angular speed of the motor and the speed setpoint.

It is also possible for the motor to be controlled depending on the difference between the motor angle and a motor angle setpoint, in phases when the motor is stopped.

The invention will be better understood on studying a particular but nonlimiting embodiment given by way of example and illustrated by the appended drawings, in which.

Figure 1:
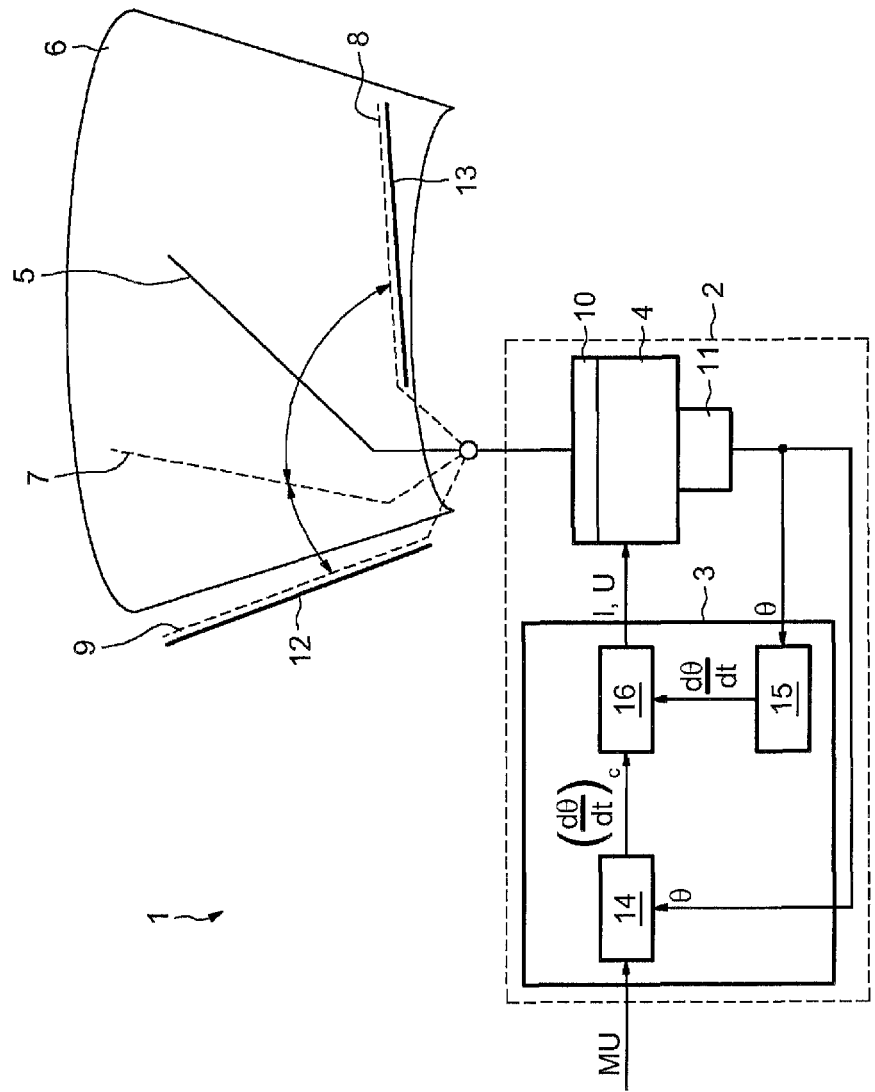
FIG. 1 shows a schematic of a windshield wiping device according to the invention.

FIG. 1 shows a schematic of a windshield wiping device 1. The windshield wiping device 1 comprises a driving device 2 comprising a control circuit 3 and a driving motor 4, and a wiper blade 5 driven by the motor 4 and wiping the surface of a windshield 6, for example of an aircraft.

More particularly, the wiper blade 5 passes over, in a back-and-forth movement, a wiped region of the windshield, which region is bounded by a first wiper blade position 7 and a second wiper blade position 8. The first and second wiper blade positions correspond to the two edges of the wiped region: they are the boundaries of the wiped area and the positions on the windshield where the rotation direction reverses. In the rest of the description the first position 7 will be considered to correspond to a minimum value $\theta_{min}$ of the motor angle, and the second position 8 will be considered to correspond to a maximum value $\theta_{max}$ of the motor angle. In addition, the wiper blade 5 may also be positioned in a parking position 9, corresponding to a motor angle $\theta_{park}$. The parking position 9 may especially be located outside of the wiped region of the windshield and may even be located beyond the windshield 6, such as shown in FIG. 1.

Depending on how the driving device is used, especially in terms of torque and speed, the driving device 2 may also comprise a reducing mechanism 10 fitted between the motor 4 and the wiper blade 5. The angle-reducing mechanism 10 may for example be formed by, on the one hand, a worm screw securely fitted to the drive shaft of the motor 4 and, on the other hand, a cog securely fastened to the windshield wiper 5, or even by three direct gear trains.

The motor 4 is a motor capable of driving its drive shaft in a first rotation direction and in the opposite rotation direction. The motor 4 therefore delivers a pendular or reversible rotation. The motor 4 may be an electric motor, for example a synchronous motor, and preferably a brushless synchronous motor. This type of motor is suited to the present application and is able to turn in one direction and then the other with high reliability, even with frequent changes in the rotation direction. This brushless motor advantageously comprises an external stator coil and a central magnetic rotor.

According to one embodiment, the motor 4 may also comprise a static brake, for example a "zero current" brake (not shown) that keeps the motor angle constant when it is no longer being supplied with current. The static brake is especially used in stop phases, to limit rotation of the motor under the effect of external elements such as wind. The motor then does not have to consume power keeping the wiper blade in its parking position.

The motor 4 may also comprise a sensor 11. The sensor 11 may be an encoder or resolver placed on the axis of the magentic rotor. The sensor 11 for example allows the angular position θ, and even the angular speed (dθ/dt), of the motor 4 to be measured, and transmits the measured values to the control circuit 3. It may also be a magnetic, mechanical, or optical sensor, etc.

The driving device also comprises the control circuit 3. The control circuit 3 comprises an output for controlling the motor 4. It may be an output providing the motor 4 with power. In this case, the current and the voltage delivered to the motor 4 allow the torque and the angular speed of the motor to be controlled.

The control circuit 3 also comprises a first input for selecting a user mode MU. This user mode may be selected by the user, who is located behind the windshield and who changes the speed of the windshield wipers depending on the weather conditions encountered: for example intermittent wiping, slow wiping, rapid wiping, no wiping. The user mode may also be delivered by a rain detector placed on the windshield and defining the wiper speed necessary to wipe the windshield.

The control circuit also comprises an input for receiving the sensor 11 values. The values of the motor angle θ or motor speed (dθ/dt) of the motor 4 are consequently used to control the motor and/or to provide feedback. Alternatively, the control circuit may also detect motor stop positions using mechanical stops 12, 13 located near the parking position of the wiper blade and near the second position of the wiper blade, respectively. The stops 12, 13 may allow the control means, each time it is turned on, to position the motor in a preset reference position by detecting a zero angular speed.

The control circuit 3 especially comprises a setpoint-generating means 14 comprising an input for receiving the user mode MU, an input for receiving the signal from the position sensor 11, and an output for delivering a speed setpoint $(dθ/dt)_c$. The control circuit 3 also comprises a defining means 15 comprising an input for receiving signals from the position sensor 11, and an output for delivering angular speed values calculated using data from the position sensor 11. Finally, the control circuit comprises a control means 16 comprising an input for receiving the speed setpoint $(dθ/dt)_c$ delivered by the setpoint-generating means 14, an input for receiving the angular speed (dθ/dt) values delivered by the defining means 15, and an output for controlling the motor 4, for example an output providing the motor 4 with power.

Figure 2:
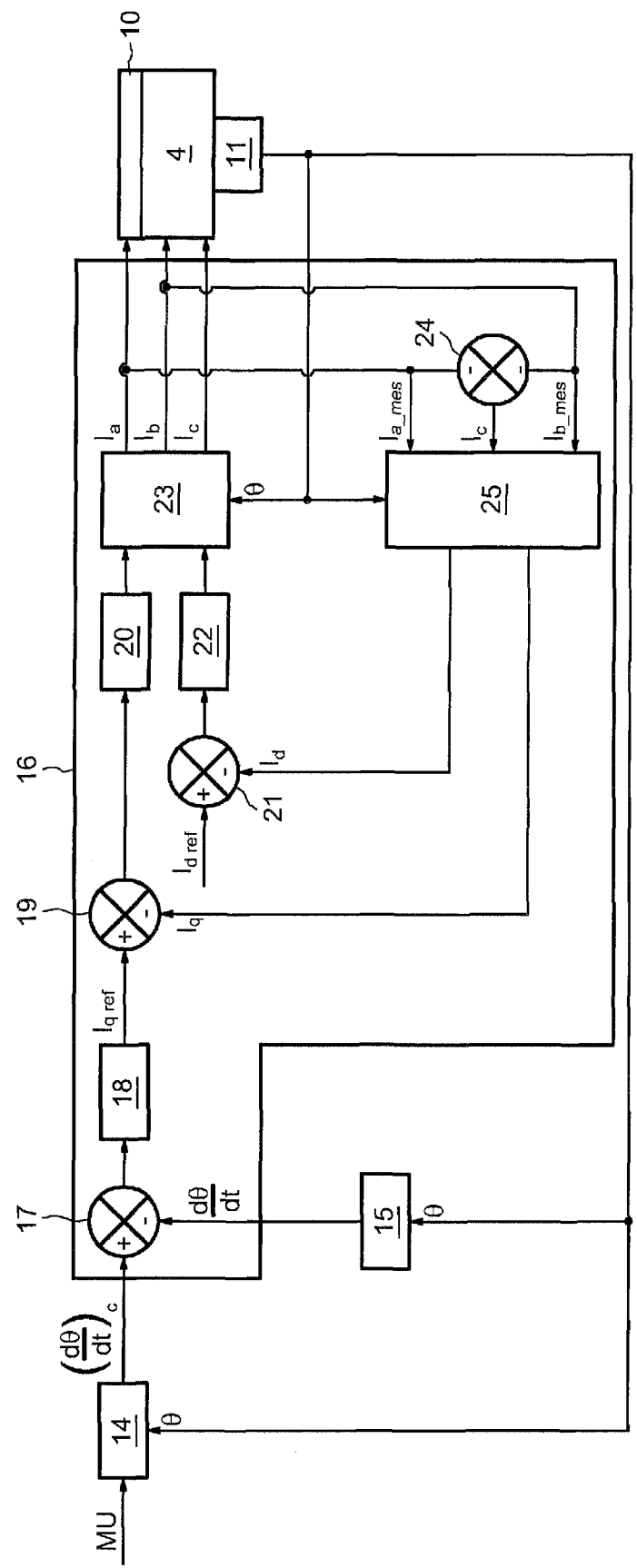
FIG. 2 shows a schematic of an embodiment of a driving device according to the invention.

FIG. 2 shows a schematic of an embodiment of the control circuit 3. In particular, FIG. 2 shows an exemplary control means 16.

The control means 16 comprises a first comparator capable of comparing the angular speed (dθ/dt) defined by the defining means 15 and the speed setpoint $(dθ/dt)_c$ delivered by the setpoint-generating means 14. The first comparator 17 delivers as output a quantity representative of the difference between the angular speed (dθ/dt) and the speed setpoint $(dθ/dt)_c$ to a first corrector 18. The first corrector 18 allows the operation of the motor 4 to be modified so as to reduce and even eliminate the difference between the angular speed of the motor and the speed setpoint. The first comparator 17 and the first corrector 18 therefore form a closed feedback loop controlling the angular speed of the motor in order for the angular speed of the motor to match as closely as possible the speed setpoint.

Closed-loop control of the speed and of the angle of the motor also makes it possible to detect, using the torque setpoint, oscillation of the wiper blade. This is because, depending on the weight of the blade and the torsional stiffness of the transmission mechanism, "mass/spring" type oscillations may be observed when the blade rubs on the windshield. Such oscillations may generate an over-torque and damage the device. The control means 3 may be able to detect such oscillations, and therefore control the motor in order to limit and even eliminate them.

The first corrector 18 thus delivers a current as output, this current being referred to as the active current $I_{q\_ref}$. The current $I_{q\_ref}$ allows the torque of the motor 4 to be controlled: it is a first current used in vector control of the motor. In the case of vector control, the torque of the motor is current-controlled, and the speed is voltage-controlled. However, the speed of the motor may also be torque-controlled. Specifically, the angular speed of the motor may be controlled by the supply current of the motor, due to the various moments that act on the wiper blade, and that may decrease the angular speed of the motor: the torque of the motor acts in opposition to these moments, and thus obtains the desired angular speed.

Thus, the control circuit 3 makes it possible to adjust, depending on the circumstances, the current delivered to, and therefore the torque delivered by, the motor. It is not necessary to apply the maximum torque of the motor at every instant to be sure to obtain the desired angular speed. By limiting in this way the torque of the motor, and therefore the supply current, the control circuit allows the electrical power delivered to the motor 4 to be reduced and therefore the efficiency of the device to be increased. Moreover, by limiting the current supplied to the motor, the control circuit also limits Joule losses due to the internal resistance of the motor. Thus the motor is more efficient and gets less hot.

The first correction means 18 may also be able to define, using differences between the speed setpoint and the angular speed of the motor, the torque required from the motor, and therefore the braking torque corresponding to the blade rubbing on the windshield and/or the frictional resistance of air to the blade. Insofar as the torque due to the blade rubbing on the windshield is the same in both operating directions of the blade, whereas the torque due to the frictional resistance of air drives or brakes the blade depending on its operating direction, the first correction means may distinguish these two torques and deduce therefrom, for example, the speed of the vehicle (as a function of the torque due to frictional air resistance and for a given atmospheric pressure) or even the state—dry or wet—of the surface of the windshield (as a function of the torque due to rubbing of the wiper blade on the windshield).

The current $I_{q\_ref}$ is then delivered to a second comparator 19, which also receives the current $I_q$ delivered to the motor by the control circuit. The second comparator 19 is capable of comparing the reference current $I_{q\_ref}$ and the applied current $I_q$. The second comparator 19 delivers as output a quantity representative of the difference between these two quantities, to a second corrector 20. The second corrector 20 also allows the operation of the motor 4 to be modified in order to compensate the difference between the desired current value $I_{q\_ref}$ and the actually applied value $I_q$. The second comparator 19 and the second corrector 20 therefore form a closed feedback loop controlling the active current $I_q$ supplied to the motor.

The control means 16 may also comprise a closed feedback loop for controlling the current $I_{d\_ref}$, which is the second current used in vector control of the motor 4. The current $I_{d\_ref}$ is delivered to a third comparator 21, which also receives the current $I_d$ delivered to the motor by the control circuit. The third comparator 21 is capable of comparing the reference current $I_{d\_ref}$ and the applied current $I_d$. The third comparator 21 delivers as output a quantity representative of the difference between these two quantities, to a third corrector 22. The third corrector 22 also allows the operation of the motor 4 to be modified so as to compensate the difference between the desired current value $I_{d\_ref}$ and the value $I_d$ actually applied. The third comparator 21 and the third corrector 22 therefore form a closed feedback loop controlling the active current $I_d$ supplied to the motor.

The second corrector 20 thus delivers as output a corrected active current $I_{q\_corr}$ and the third corrector 22 delivers as output a corrected active current $I_{d\_corr}$. The currents $I_{q\_corr}$ and $I_{d\_corr}$ allow the torque of the motor 4 to be controlled i.e. the motor is vector controlled. This vector control input is then converted into a scalar control input applied to the three phases of the motor.

Thus, the control means 16 also comprises a conversion means 23. The conversion means 23 comprises an input for receiving the motor angle θ values, and two inputs for receiving the currents $I_{q\_corr}$ and $I_{d\_corr}$. The conversion means 23 allows the vector control input to be converted into a scalar control input and delivers as output three currents $I_a$, $I_b$, and $I_c$. The currents $I_a$, $I_b$, and $I_c$ are the currents that are delivered by the control means 16 and are directly applied to the motor 4, in order to make the drive shaft of the motor rotate. The conversion means 23 may thus implement a Park transform, in order to obtain the currents $I_a$, $I_b$, and $I_c$ depending on the vector control currents $I_{q\_corr}$ and $I_{d\_corr}$.

The control means 16 finally comprises a fourth comparator 24 and an inversion means 25 receiving as input the currents $I_a$, $I_b$, and θ, and delivering as output corresponding currents $I_q$ and $I_d$. The fourth comparator 24 and the inversion means 25 allow closed feedback loop control of the motor control currents delivered to the motor. In the present case, the inversion means 25 may implement an inverse Park transform.

Figure 3:
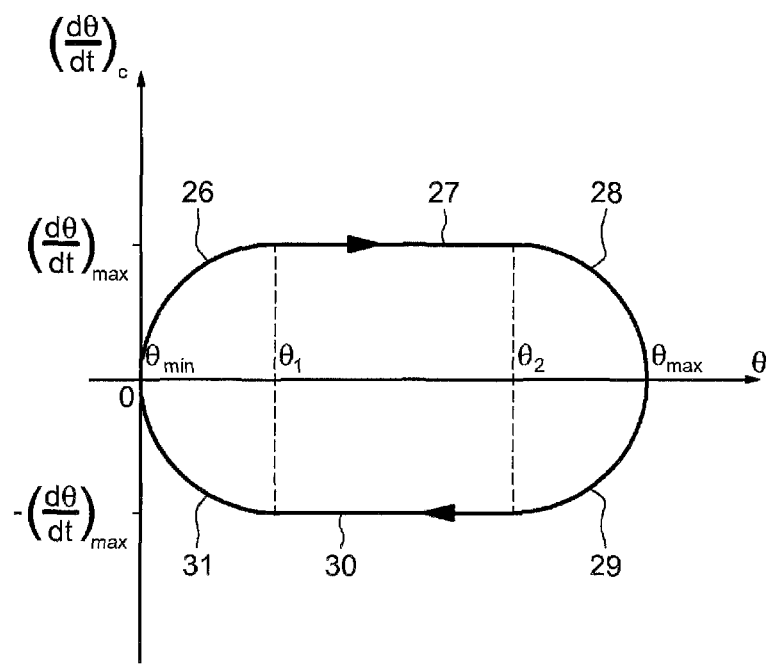
FIG. 3 shows an exemplary speed setpoint as a function of motor angle, according to the invention.

FIG. 3 shows an exemplary speed setpoint delivered by the setpoint-generating means 14, for a given user mode, when the wiper blade is wiping the wiped area.

The speed setpoint comprises a first part 26, for values of the motor angle θ lying between $θ_{min}$ and a first value $θ_1$. In the first part, the speed setpoint increases continuously with the motor angle θ. The first part corresponds to the speed setpoint of the wiper blade when the latter is in the first position 7 (corresponding to $θ_{min}$) and begins moving toward the second position 8 (corresponding to $θ_{max}$). The first part 26 corresponds to a phase in which the wiper blade gradually accelerates until it reaches the preset constant angular speed (corresponding to the maximum angular speed $(dθ/dt)_{max}$ desired), when the position of the wiper blade is at the first value $θ_1$. In particular, the control circuit 16 applies a gradually increasing current to the motor 4 in order to obtain the desired angular speed, while limiting the electrical power consumed by the motor. Preferably, the acceleration of the wiper blade is constant throughout the first part 26.

The first value $θ_1$ may be defined by the setpoint means 14, especially depending on the user mode. Specifically, the speed setpoint must be equal to the maximum angular speed $(dθ/dt)_{max}$ desired by the user when the blade reaches the first value $θ_1$. If the user speed is high, the setpoint-generating means 14 may choose a higher first value $θ_1$ in order to allow the angular speed of the motor to increase over a larger angular distance. Thus the acceleration is slower, and electric power consumption decreased.

In contrast, if the user speed is low, the first value $θ_1$ will possibly be chosen to be smaller because a smaller angular distance will be required to reach the desired angular speed.

When the preset maximum angular speed is reached, the speed setpoint then comprises a second part 27 in which it remains constant, for values of the motor angle θ lying between the first value $θ_1$ and a second value $θ_2$. This angular distance corresponds to the central region of the wiped area. The fact that the angular speed is constant in this region ensures better user visual comfort.

When the angular value reaches the second value $θ_2$, the speed setpoint then comprises a third part 28, for values of the motor angle θ lying between the second value $θ_2$ and the value $θ_{max}$. In the third part, the speed setpoint continuously decreases with the motor angle θ. The third part corresponds to the speed setpoint of the wiper blade when the latter approaches the second position 8 (corresponding to $θ_{max}$) and prepares to make a half-turn. The third part 28 corresponds to a phase in which the wiper blade gradually decelerates, until its angular speed reaches zero, when the position of the wiper blade is at the value $θ_{max}$. In particular, the control circuit 16 applies a gradually decreasing current to the motor 4 in order to reduce the angular speed to zero. The deceleration of the wiper blade may for example be constant throughout the third part 28.

The second value $θ_2$ may be defined by the setpoint-generating means 14, depending on the deceleration characteristics of the angular speed and the user speed.

The speed setpoint comprises a fourth part 29, for values of the motor angle θ lying between $θ_{max}$ and the second value $θ_2$. In the fourth part, the speed setpoint continuously increases with the motor angle θ. The fourth part corresponds to the speed setpoint of the wiper blade when the latter is located in the second position 8 (corresponding to $θ_{max}$) and begins to move toward the first position 7 (corresponding to $θ_{min}$). The fourth part 29 corresponds to a phase in which the wiper blade gradually accelerates, until the preset constant angular speed (corresponding to the desired maximum angular speed $(-(dθ/dt)_{max})$) is reached, when the position of the wiper blade is at the second value $θ_2$. In particular, the control circuit 16 applies a gradually increasing current to the motor 4 in order to obtain the desired angular speed, while limiting the electrical power consumed by the motor.

The second value $θ_2$ may be defined differently in the third part 28 and the fourth part 29. This is because, in the third part 28, the second value $θ_2$ is defined depending on deceleration properties, whereas in the fourth part 29, the second value $θ_2$ is defined depending on acceleration properties. Thus, when the wiper blade changes direction at the second position 8, the second value $θ_2$ may be modified by the setpoint-generating means 14.

When the maximum angular speed is reached, the speed setpoint then comprises a fifth part 30 in which it remains constant, for values of the motor angle θ lying between the second value $θ_2$ and the first value $θ_1$. This angular distance again corresponds to the central region of the wiped area.

When the angular value reaches the first value $θ_1$, the speed setpoint then comprises a sixth part 31, for values of the motor angle θ lying between the first value $θ_1$ and the value $θ_{min}$. In the sixth part, the speed setpoint continuously decreases with motor angle θ. The sixth part corresponds to the speed setpoint of the wiper blade when the latter approaches the first position 7 (corresponding to $θ_{min}$) and prepares to make a half-turn. The sixth part 31 corresponds to a phase in which the wiper blade gradually decelerates, until its angular speed reaches zero, when the position of the wiper blade is at the value $\theta_{min}$. In particular, the control circuit 16 applies a gradually decreasing current to the motor 4 in order to reduce the angular speed to zero.

The first value $\theta_1$ of the sixth part 31 may also be different to the first value $\theta_1$ of the first part 26.

Figure 4:
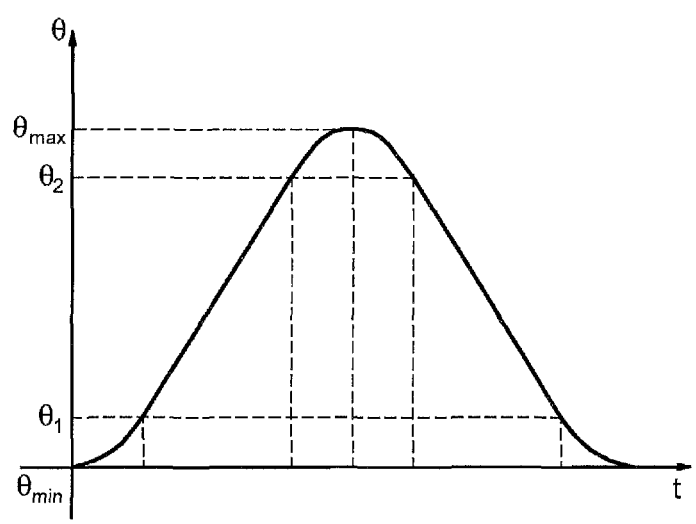
FIG. 4 shows the variation in the motor angle as a function of time, according to the invention.

FIG. 4 shows the variation of the motor angle as a function of time, when the motor is controlled using a speed setpoint as shown in FIG. 3.

It will be observed, in FIG. 4, that the angle $\theta$ has a generally sinusoidal or quasi-sinusoidal shape with rectilinear portions between the values $\theta_1$ and $\theta_2$. The angle $\theta$ therefore does not vary suddenly in time: it is thus possible to keep the torque of the motor at a low value, and therefore to achieve a higher efficiency.

However, the invention is not limited to this embodiment. In particular, the setpoint-generating means may also deliver a speed setpoint comprising a preset period in which, when the angle of the motor is $\theta_{min}$ or $\theta_{max}$, the speed setpoint remains zero. In this case, the control means may feed back the position of the motor, and not the speed of the motor, in order to achieve more precise positioning. Moreover, the static brake makes it possible to keep the motor in the desired stop position, and therefore the motor does not need to work permanently to remain in the desired position. Setting the speed setpoint to zero for a preset period during a half-turn may allow the motor to cool, especially by limiting Joule heating.

Thus it is possible to modify easily the wiping rhythm of the wiper blade, for example the rhythm may be intermittent and slow, slow, fast, intermittent and fast or even intermittent per half-cycle (the blade stopping at each half-turn). In the two latter cases, the motor gets less hot while the wiping of the windshield remains effective and takes place regularly.

Likewise, the setpoint-generating means may also be able to deliver a speed setpoint that changes the region wiped depending upon the wiping rhythm, i.e. the wiper blade may be made to make the half turns at different angles $\theta_{min}$ and $\theta_{max}$. Thus, when the wiping rhythm chosen by the user involves a high speed, the angles $\theta_{min}$ and $\theta_{max}$ can for example be brought closer together, i.e. the wiped region can be made smaller, in order to compensate for elastic deformation of the wiper blade on each half-turn, under the effect of inertia.

By virtue of the control circuit according to the invention, it is possible to limit the peak current flow during acceleration phases, and therefore to use the motor more efficiently. Joule heating is reduced. Moreover, since the wiping speed never exceeds the preset maximum speed, the visual comfort of the user is increased relative to a device using a connecting rod and crank system the speed of which varies quasi-sinusoidally with the angle of the wiper blade. Finally, it is easily possible to improve the compromise between blade acceleration and maximum wiping speed, or to modify the angles defining the area wiped and the parking position.

Furthermore, the device comprises fewer mechanical parts than a connecting rod and crank system, and is therefore cheaper and less bulky. It is no longer necessary to redesign the device for each type of vehicle. In addition, it is possible to use the same device to actuate the left-hand wiper and the right-hand wiper of a vehicle. The device is also easier to fit, by virtue of an electronic unit, to a motor unit and to blades that can be adjusted separately and that are more independent than those of the prior art. Specifically, except for the position sensor of the motor, which delivers a signal to the control circuit, each unit of the device is independent and requires little wiring to the other units.

Finally, the first correction mean may also be able to define, using differences between the speed setpoint and the angular speed of the motor, the torque required from the motor, and therefore the braking torque corresponding to the blade rubbing on the windshield and/or the frictional resistance of air to the blade. Insofar as the torque due to the blade rubbing on the windshield is the same in both operating directions of the blade, whereas the torque due to the frictional resistance of air drives or brakes the blade depending on its operating direction, the first correction means may distinguish these two torques and deduce therefrom, for example, the speed of the vehicle (as a function of the torque due to frictional air resistance and for a given atmospheric pressure) or even the state—dry or wet—of the surface of the windshield (as a function of the torque due to rubbing of the wiper blade on the windshield).

Closed-loop control of the speed and angle of the motor also makes it possible to detect oscillation of the wiper blade. This is because, depending on the weight of the blade and the stiffness of the system, "mass/spring" type oscillations may be observed when the blade rubs on the windshield. Such oscillations may generate an over-torque and damage the device. Closed feedback loop control of the wiping speed of the blade makes it possible to detect such oscillations, and to control the motor so that they are immediately cancelled out or stopped or reduced when they occur.

The invention claimed is:

1. A control circuit for an electric motor, especially for driving a windshield wiper, wherein the control circuit comprises:
   a controller coupled to the electric motor, the controller capable of delivering an output signal for controlling the electric motor, the controller being able to send control signal to the electric motor to alter the angle of the motor between a given minimum value and a given maximum value, wherein the controller comprises an input for receiving a speed setpoint, wherein the controller controls the angular speed of the motor depending on the inputted speed setpoint; and
   a setpoint generator coupled to the electric motor, the setpoint generator comprising: an input for receiving values of the motor angle from the electric motor; and an output coupled to the controller for delivering the speed setpoint to the controller, wherein the setpoint generator defines the speed setpoint using a continuous function of the received values of the motor angle, wherein the continuous function is a function for which, when the motor angle approaches a given angle, the speed setpoint approaches a speed setpoint value defined for the given angle such that there are no abrupt changes in the speed setpoint value.

2. The circuit as claimed in claim 1, wherein the setpoint generator is able to define a first angular value for the motor, which value is greater than the minimum value, and a second angular value lying between the first angular value and the maximum value, to deliver a speed setpoint varying with the value of the motor angle when the latter lies between the minimum value and the first value or between the second value and the maximum value, and to deliver a speed setpoint of constant absolute value when the value of the motor angle lies between the first and the second value.

3. The circuit as claimed in claim 2, in which the setpoint generator further comprises an input for selecting a user mode, and in which the value of the constant speed setpoint, and the maximum value, the minimum value, the first value and the second value of the motor angle, are defined depending on the user mode.

4. The circuit as claimed in claim 1, wherein the controller further comprises an input for receiving values of the angular speed of the motor, and wherein the controller is able to control the motor torque depending on the difference between the angular speed of the motor and the speed setpoint.

5. The circuit as claimed in claim 4, further comprising a definer comprising an input for receiving values of the motor angle, and an output for delivering, to the controller, the angular speed of the motor, the definer being able to calculate the angular speed of the motor using the values of the motor angle.

6. The circuit as claimed in claim 4, wherein the control means further comprises an input for receiving a motor angle setpoint and an input for receiving motor angle values, and is able, in phases when the motor is stopped, to control the motor depending on the difference between the motor angle and the motor angle setpoint.

7. A driving device for producing an alternating rotary movement, comprising a circuit as claimed in claim 1, and a driving electric motor.

8. The driving device as claimed in claim 7, wherein the motor is a synchronous motor.

9. A windshield wiping device, for an automotive vehicle or an aircraft, comprising at least one driving device as claimed in claim 7, and a windshield wiper blade driven by the driving device.

10. A method for controlling an electric motor, comprising:
  operating the electric motor using a controller, the controller comprising:
    a controller coupled to the electric motor, the controller capable of delivering an output signal for controlling the electric motor; and
    a setpoint generator coupled to the electric motor, the setpoint generator comprising: an input for receiving values of a motor angle from the electric motor; and an output coupled to the controller for delivering the speed setpoint to the controller, wherein the setpoint generator defines the speed setpoint using a continuous function of the received values of the motor angle, wherein the continuous function is a function for which, when the motor angle approaches a given angle, the speed setpoint approaches a speed setpoint value defined for the given angle such that there are no abrupt changes in the speed setpoint value;
  controlling the motor using the controller to make the motor angle vary between a given minimum value and a given maximum value, and using the controller to alter an angular speed of the motor depending on the speed setpoint received by the controller from the setpoint generator.

11. The method as claimed in claim 10, wherein a first angular value of the motor, greater than the minimum value, and a second angular value, lying between the first angular value and the maximum value, are defined, the method further comprising altering the speed setpoint with the value of the motor angle when the motor lies between the minimum value and the first value or between the second value and the maximum value, and wherein a constant speed setpoint is delivered when the value of the motor angle lies between the first and the second value.

12. The method as claimed in claim 11, in which the value of the constant speed setpoint, and the maximum value, the minimum value, the first value and the second value of the motor angle are defined depending on a user mode.

13. The method as claimed in claim 10, wherein the motor torque is also controlled depending on the difference between the angular speed of the motor and the speed setpoint.

14. The method as claimed in claim 10, in which the motor is controlled depending on the difference between the motor angle and a motor angle setpoint, in phases when the motor is stopped.

\* \* \* \* \*